US005253563A

United States Patent [19]

Smith

[11] Patent Number: 5,253,563

[45] Date of Patent: Oct. 19, 1993

[54] UNIVERSAL SUPPORT APPARATUS FOR HEATING AND SUPPORTING OF A MUSICAL INSTRUMENT

[75] Inventor: Gary Smith, 256 W. 5th Ave., Collegeville, Pa. 19426

[73] Assignees: Mobile Music, Horsham; Gary Smith, Collegeville; Joseph Stefano, Oreland, all of Pa. ; a part interest

[21] Appl. No.: 836,581

[22] Filed: Feb. 14, 1992

[51] Int. Cl.[5] ........ G01G 5/00

[52] U.S. Cl. ........ 84/453; 84/385 A

[58] Field of Search ........ 84/385 A, 453; 219/201, 219/221, 521, 523; 211/13, 163; 248/127

[56] References Cited

U.S. PATENT DOCUMENTS

| | | | |
|---|---|---|---|
| 1,045,583 | 11/1912 | Mills | 84/385 A |
| 1,646,165 | 10/1929 | Naujoks et al. | 84/385 A |
| 4,145,950 | 3/1979 | Glantz | 84/385 R |
| 4,304,166 | 12/1981 | Stefano et al. | 84/385 A |
| 4,407,182 | 10/1983 | Biasini | 84/453 |
| 4,529,865 | 7/1985 | Oakes, Jr. | 219/201 |
| 4,572,050 | 2/1986 | Werner | 84/385 A |
| 4,695,022 | 9/1987 | Mendonsa et al. | 248/176 |
| 4,738,180 | 4/1988 | McKnight | 84/385 A |
| 4,926,735 | 5/1990 | Smith | 84/453 |

*Primary Examiner*—Michael L. Gellner
*Assistant Examiner*—P. Stanzione
*Attorney, Agent, or Firm*—Sperry, Zoda & Kane

[57] ABSTRACT

An apparatus for supporting of one or more musical instruments and preventing damage thereto as well as providing gentle heating thereof during non-usage. The apparatus includes multiple spacing means for maintaining a clear air flow channel between the instrument and the mounting peg to facilitate even heating of the instrument. The device includes a plurality of apertures for facilitating heat flow into contact with the instrument and a plurality of mounting locations upon a rotatable base for facilitating positioning of more than one instrument with respect thereto. A device is also included for introducing moisture into the warm air flow for the even heating and the maintenance of a moist condition of a held musical instrument to maintain tonal qualities thereof. A clip retaining device is included for holding the spacing devices when not in use.

The apparatus is usable for supporting many different types of musical instruments, in particular woodwinds, by utilizing a single universally usable peg.

20 Claims, 6 Drawing Sheets

UNIVERSAL SUPPORT APPARATUS FOR HEATING AND SUPPORTING OF A MUSICAL INSTRUMENT

BACKGROUND OF THE INVENTION

1. Field Of The Invention

The present invention deals with devices usable for solving the problems of instrument access and intonation which are experienced by musicians who play various woodwind and other instruments such as C-flutes, clarinets, soprano clarinets, oboes, English horns, also flute, soprano sax and piccolos as well as others which may include brass instruments such as flugle horns.

During performances with these instruments it is advantageous to provide ready access to multiple instruments for musicians who play multiple instruments commonly known as "doublers". A quick access to each new instrument is extremely important. It is also important that the instrument maintain its intonation characteristics by being maintained in a slightly warmed and moistened condition. The present invention provides a novel means for achieving this purpose while at the same time minimizing possible damaging to the instrument itself by the construction of the instrument supporting means and by spacing of the instrument from the supporting means thereof to facilitate even heat flow thereon.

When an instrument is initially used by a musician the tones will be somewhat distorted since the instrument has not yet assumed the normal operating temperature and moisture conditions being warmed and moistened by the air being expelled by the musician. The present invention provides a novel means and construction for maintaining this level of warming and level of intonation of the musical instrument during times of non-use especially by doublers. A peg or pegs of the present invention may be used for mounting a plurality of instruments with respect to the stand and is universally usable for mounting any different type of instrument as desired with respect to the stand.

2. Description Of The Prior Art

There are numerous prior art devices which have been patented which are useful in attempting to solve the problems of the present invention. However, none of them have proved to be as advantageous as the apparatus of the present invention. None of the cited references shown below show the idea of heating in the manner as shown in the present invention and none show the support of many different types of instruments in a single universally applicable peg design. Examples of these patents are shown in U.S. Pat. No. 1,045,583 patented Nov. 26, 1912 to R. W. Mills on an Instrument Holder; U.S. Pat. No. 1,646,165 patented Oct. 18, 1927 to W. Naujoks et al on a Support For Musical Instruments; U.S. Pat. No. 4,145,950 patented Mar. 27, 1979 to F. Glantz on a Wind Instrument Supporting Stand; U.S. Pat. No. 4,304,166 patented Dec. 8, 1981 to J. Stefano et al on a Rotatable Musical Instrument Stand; U.S. Pat. No. 4,407,182 patented Oct. 4, 1983 to A. Biasini on a Musical Instrument Stand; U.S. Pat. No. 4,529,865 patented Jul. 16, 1985 to P. Oakes, Jr. on an Electrically Heated Musical Instrument Stand; U.S. Pat. No. 4,572,050 patented Feb. 25, 1986 to M. Werner on a No Strap Saxophone Stand; U.S. Pat. No. 4,695,022 patented Sep. 22, 1987 to A. Mendonsa et al on a Clarinet Stand; U.S. Pat. No. 4,738,180 patented Apr. 19, 1988 to E. McKnight on an Instrument Case And Stand and U.S. Pat. No. 4,926,735 patented May 22, 1990 to G. Smith on a Heated Rotatable Musical Instrument Stand.

SUMMARY OF THE INVENTION

The present invention provides an improved universal support apparatus for heating and supporting of one or more musical instruments which includes a base member having a lower base member defining a base inlet therein. The base member also includes an upper base member which is rotatably movable with respect to the lower base member and defines a heated air chamber therebetween.

The heated air chamber is preferably in fluid flow communication with respect to the base inlet to facilitate supplying of heated and moistened air thereto. The upper base member further defines at least one mounting location thereon including at least one mounting device and base outlet to facilitate support of at least one musical instrument with respect thereto. The base outlet is registrable with respect to the heated air chamber and is designed to be in fluid flow communication therewith to allow heated air to exit therefrom into the heated air chamber. Furthermore the mounting device preferably includes a plurality of symmetrically positioned engagement apertures for use in facilitating mounting of the instrument support devices thereto.

A heating means may preferably be positioned in fluid flow communication with respect to the base inlet and the heated air chamber for supplying of heated air thereto as desired. A moistening means may also preferably be positioned within the fluid flow path of the heated air in order to increase the humidity of the air being supplied to the mounted musical instrument to facilitate the maintenance of the normal operating moisture level therein.

The instrument support is preferably of a ductile thermoplastic and is detachably secured with respect to the mounting device at the mounting location on the base. The instrument support preferably includes a body member detachably secured with respect to the mounting location of the base and extending upwardly therefrom such as to be adapted to receive a musical instrument positioned thereon as desired for temporary storage. The instrument support of the present invention is particularly adaptable for use with any of a variety of different types of instruments, especially woodwinds.

The body member further defines a support chamber therein and a support chamber inlet in fluid flow communication with respect to the support chamber defined therein. This support chamber inlet is preferably in fluid flow communication with respect to the base outlet and the heated air chamber whenever the body is mounted with respect to the mounting device of the base member to thereby allow heated air to flow from the heated air chamber to the support chamber as desired. The body member further defines a lateral body outlet therein to allow heated air to flow outwardly therethrough laterally from the support chamber to then contact the musical instrument as desired when positioned upon the body member for facilitating the heating thereof. The body member may further include an upper outlet at the uppermost position on the body member to facilitate exit of heated air therefrom.

A securement device is preferably attached or integral with respect to the body member and is detachably secured with respect to the mounting means to attach the instrument support with respect to the base member as desired. This securement device preferably includes a plurality of L-shaped downwardly extending arm members which are adapted to extend into the engagement apertures defined at the mounting positions on the base member.

An external spacing device is adapted to be attached with respect to the body member of the instrument support means above the lateral body outlets. The external spacing device defines spacing openings therein to facilitate the positioning of the instruments and the movement of heated air past the external spacing means after exiting the body outlet. In this manner the heated air will travel longitudinally along the outer surface of the interior of the musical instrument to facilitate even warming thereof. This external spacing device preferably includes a plurality of ribs extending laterally outward therefrom such as to define the spacing openings in between each adjacent pair of ribs in such a manner as to facilitate this travel of heated air along the instrument supported thereon. The configuration of these ribs can be radially outwardly straight or can be spiral as desired. The spiral shape for the ribbing induces an additional element of flexibility to the spacing means thereby further aiding in the prevention of damaging to musical instruments positioned thereon.

A visual aiding means such as a fluorescent or luminescent paint layer may be located in the upper area of the instrument support to facilitate viewing thereof under low light environments commonly found in areas where musicians play. Furthermore a space retaining device may be positioned within the heated air chamber of the base member adjacent the lowermost end thereof to facilitate storage of the external spacing means when not utilized. With most configurations various different sizes of external spacing members can be included and those spacing members which are not utilized can be gathered within the spacing retaining means to facilitate storage and prevent loss thereof. Also a clip means may be positioned within the space retaining means to facilitate attachment of the individual external spacing devices with respect to the base member and further minimize possible misplacement thereof.

It is an object of the improved universal support apparatus for heating and supporting of a musical instrument of the present invention to provide a relatively inexpensive unit.

It is an object of the improved universal support apparatus for heating and supporting of a musical instrument of the present invention to provide an easily maintained musical instrument support device.

It is an object of the improved universal support apparatus for heating and supporting of a musical instrument of the present invention to provide a device for supporting instruments which minimizes possible damage thereto.

It is an object of the improved universal support apparatus for heating and supporting of a musical instrument of the present invention wherein multiple instruments can be supported simultaneously.

It is an object of the improved universal support apparatus for heating and supporting of a musical instrument of the present invention wherein heating of instruments supported thereon is enhanced.

It is an object of the improved universal support apparatus for heating and supporting of a musical instrument of the present invention wherein high ductile thermoplastic is used for construction to minimize cost and to further minimize instrument damage.

It is an object of the improved universal support apparatus for heating and supporting of a musical instrument of the present invention wherein various different sizes of instruments can be accommodated in the same instrument support peg.

It is an object of the improved universal support apparatus for heating and supporting of a musical instrument of the present invention wherein a moisture supply means can be positioned within the fluid flow of air passing to the supported musical instrument to maintain the moisture level therein for maintaining tonal qualities thereof.

It is an object of the improved universal support apparatus for heating and supporting of a musical instrument of the present invention wherein a storage means is provided for support spacers not currently being utilized.

It is an object of the improved universal support apparatus for heating and supporting of a musical instrument of the present invention wherein usage with a great number of different types of musical instruments is possible.

It is an object of the improved universal support apparatus for heating and supporting of a musical instrument of the present invention wherein energy requirements are minimized.

It is an object of the improved universal support apparatus for heating and supporting of a musical instrument of the present invention wherein viewing in a dim lit environment is enhanced.

It is an object of the improved universal support apparatus for heating and supporting of a musical instrument of the present invention wherein a mounting system is provided between individual instrument support pegs and the base which has axial symmetry.

It is an object of the improved universal support apparatus for heating and supporting of a musical instruments wherein a single mounting peg is universally usable with respect to many different types of instruments, in particular woodwind instruments.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENTS

Figure 1:
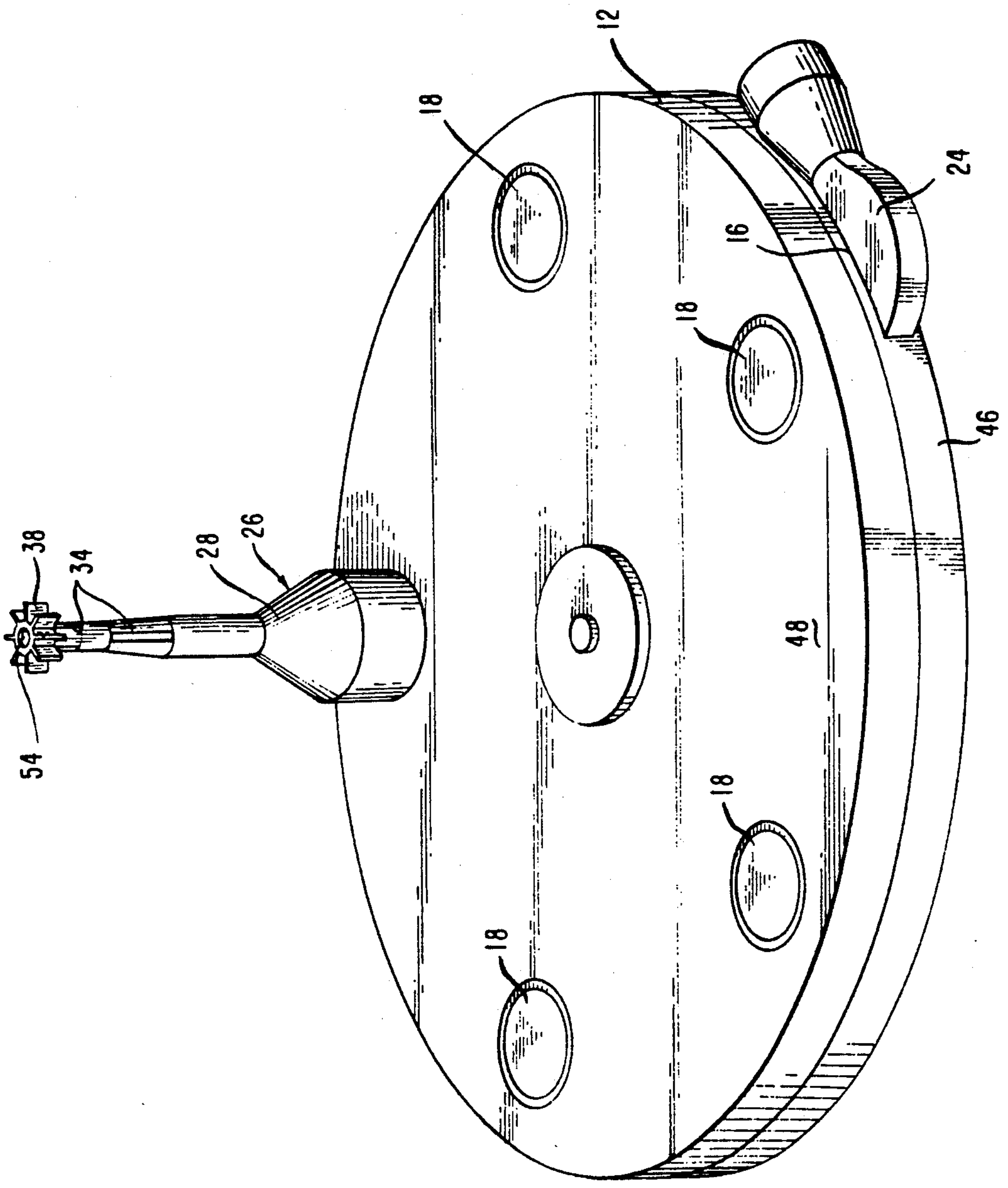
FIG. 1 is a front perspective illustration of an embodiment of the universal musical instrument support apparatus of the present invention.
Figure 3:
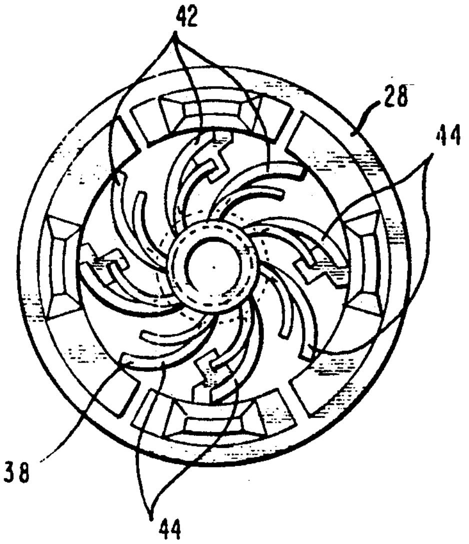
FIG. 3 is a top cross sectional view of the embodiment shown in FIG. 2.

The present invention provides an apparatus for positioning of one or more musical instruments 10 for ready access. The apparatus of the present invention includes a base member 12 which may be configured to include a stationary lower base member 46 and a movable upper base member 48. Preferably the upper base member 48 is rotatably movable with respect to the lower base member 46. The base member 12 will define a heated air chamber means 14 therein. Preferably the lower base member 46 and the upper base member 48 will cooperate to define this heated air chamber 14 therebetween.

The heated air chamber 14 is designed to be a reservoir for heated air provided to the system for distribution to the various musical instruments retained thereon. For this purpose the base member 12 and most particularly the lower base member 46 will define a base inlet means 16 in fluid flow communication with respect to the heated air chamber means 14 to supply heated air thereto. The heating means 24 will preferably be connected with respect to the base inlet 16 to facilitate supplying heat therein and heating of the air thereby within the heated air chamber means 14.

The upper portion of the base member 48 will preferably include one or more mounting locations 18 defined thereon each of which includes a mounting means 20 as well as a base outlet means 22. The base outlet means 22 is in fluid flow communication with respect to the heated air chamber means 14 to allow heated air to exit therefrom and be distributed to the individual instruments 10 mounted upon the present apparatus.

Figure 4:
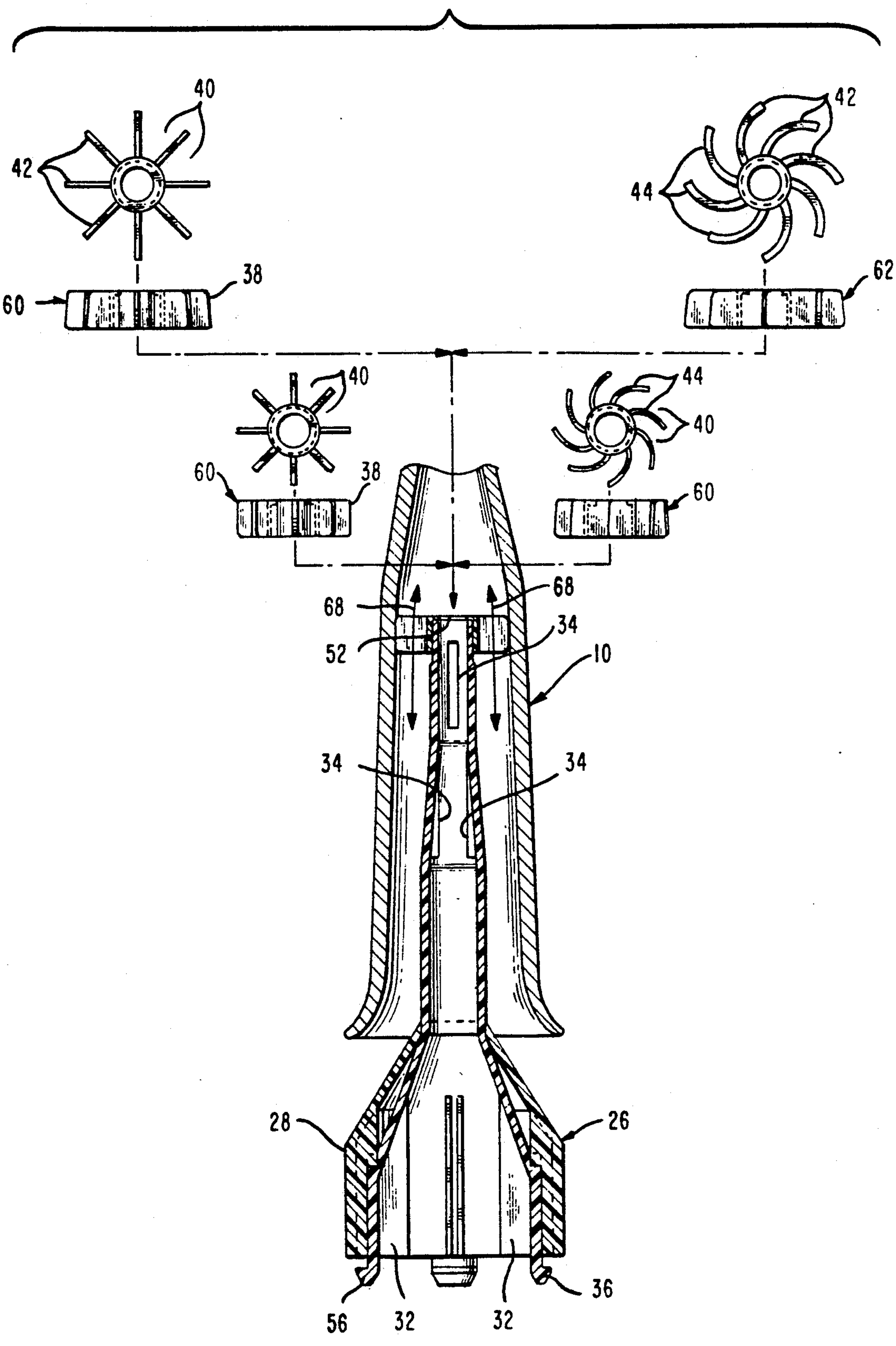
FIG. 4 is a front plan assembly view showing different embodiments for the spacing means.

The instrument support means 26 will include a body member 28 extending generally vertically upwardly being adapted to receive any one of a variety of different shapes and configurations of musical instruments positioned thereon. Normally the body member 28 will be usable with instruments having an open bell front portion such as shown in FIG. 4 such that the bell portion is placed downwardly over the upwardly extending body member 28.

The body member 28 preferably defines a support chamber means 30 therein. The body member further includes a support chamber inlet means 32 in fluid flow communication with respect to the support chamber means 30. The support chamber inlet 32 is designed to receive heated air from the base member 12 and for warming of the air within the support chamber 30 and distribution outwardly through body outlets 34 also in fluid flow communication with respect to the support chamber 30.

The individual instrument support means 26 will further include a securement means 36 to facilitate securement with respect to the upper base member 48. When the individual body members 28 are secured through securement means 36 to the base 12 the support chamber inlet means 32 will preferably be registered with respect to the base outlet means 22 to be adapted to receive heated air distributed therefrom. In this manner the heated air will be distributed from the heated air chamber 14 to the support chamber 30 of each and every instrument support 26 positioned upon the musical instrument supporting apparatus.

In a similar manner to the heating of the musical instruments it is often necessary to maintain the moisture level therein. Immediately after usage the instrument starts to lose tonal qualities resulting from the loss of moisture levels from the instrument which occurs as a result of drying. This drying is further enhanced with the use of the present invention wherein heating may be provided. To offset this drying and particularly to offset this drying when the instrument is being in contact with heated air passing therethrough, it is preferable to include within the present invention a humidification means 72 which may take the form of one or more individual sponges 74 adapted to be wetted immediately prior to usage. The heated or non-heated air passing thereover will pick up moisture therefrom for carrying the moisture to any musical instrument supported upon the stand. In this manner the humidity and/or temperature conditions of instruments supported on the stand can be accurately controlled.

To facilitate the flow of heated air along the musical instrument 10 while mounted upon the instrument support means 26 an external spacing means 38 will preferably be positioned extending about the outer portion of body member 28. This external spacing means 38 will be maintained a distance of spacing between the body member 28 and the musical instrument 10 itself. This spacing will minimize the possibility of damaging of the musical instrument and will be basically self centering to cause the musical instrument to seat in a gentle fashion and thereby prevent the possibility of damaging thereof.

In order to facilitate the even flow of heat from the body outlet means 34 along the entire length of the musical instrument 10 a spacing opening means 40 is preferably defined in the external spacing means 38 to facilitate the flow of heated air thereby. These spacing openings 40 are preferably defined between adjacent rib members 42 which extend radially outwardly in the configuration of the external spacing member 38. These rib means may extend radially outwardly in a straight manner as shown in the upper left portion of FIG. 4 or may extend outwardly in a spiral manner to provide a spiral rib means 44 as shown in the upper right portion of FIG. 4.

The apparatus of the present invention is designed to be formed of a resilient thermoplastic material to add some element of flexible resilience to the construction of the instrument support means 26. This slight resilience minimizes the possibility of damaging of the instrument when it is quickly placed on the instrument support stand as is often required by musicians during actual live performances. Furthermore the flexible resilience of the support stand is aided by the configuration of the spiral rib means 44 which aids in positioning of the instrument and also adds an additional element of flexibility to prevent damaging thereof while still fully defining the spacing openings 40 between adjacent rib members 42. Thus as air exits the lateral openings 52 to facilitate heating of the device the air can travel vertically along the musical instrument 10 up and down completely while still providing a full measure of mounting by the usage of the spiral rib means 44 or for that matter the basic rib means 42 also.

An upper outlet 54 may be positioned adjacent the uppermost end of the instrument support means 26 to facilitate the exiting of air outwardly therefrom as desired.

Furthermore during normal operating conditions often very dimly lit environments are encountered wherein it is necessary for a musician to immediately determine the location of specific mounting locations for his musical instrument 10. For this reason a visual aiding means 50 such as a fluorescent or luminescent paint layer may be included along the upper portion of the instrument support means 26 to facilitate location thereof.

The individual instrument support means 26 of the present invention are selectively mountable with respect to the mounting location means 18 and specifically with respect to the mounting means 20 itself. For this purpose the securement means 36 may include arm members 56 extending downwardly from the body member 28 of instrument support means 26. These downwardly extending arm members 56 are preferably L-shaped and are adapted to interlock with respect to engagement apertures 58 defined in the upper base member 48 at each of the mounting locations 18 positioned thereon. This configuration of L-shaped downwardly extending arm members 56 is preferably of axial symmetry with respect to the axis of the instrument support means 26 to facilitate stability of securement of the body member 28 with respect to base member 12.

The present apparatus is designed to be used with many different types of instruments and as such various different sizes of spacers may be provided with respect to the same design. These spacers may include small spacers 60 or larger spacers 62 or even additional spacers intermediate therebetween. In this manner various different sizes of instruments can be utilized. As such the basic peg of the present invention is particularly usable for mounting of flutes, clarinets, soprano clarinets oboes and English horns. The adapters themselves can additionally be used for use with other differently configured instruments such as alto flutes, soprano saxophones or the like. As described above the different type spacers provide an adaptability of usage not available heretofore. The basic peg provides a universal adaptability for usage with many different types of instruments utilizing a single peg design.

Figure 6:
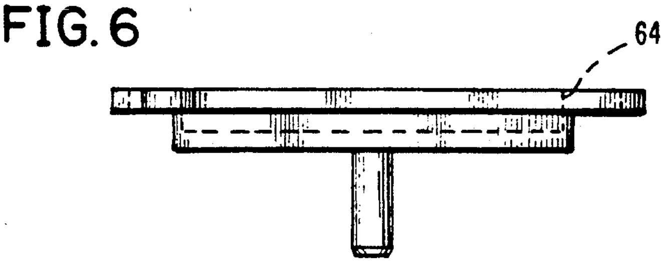
FIG. 6 is a side plan view of an adapter plate for use with the present invention.
Figure 7:
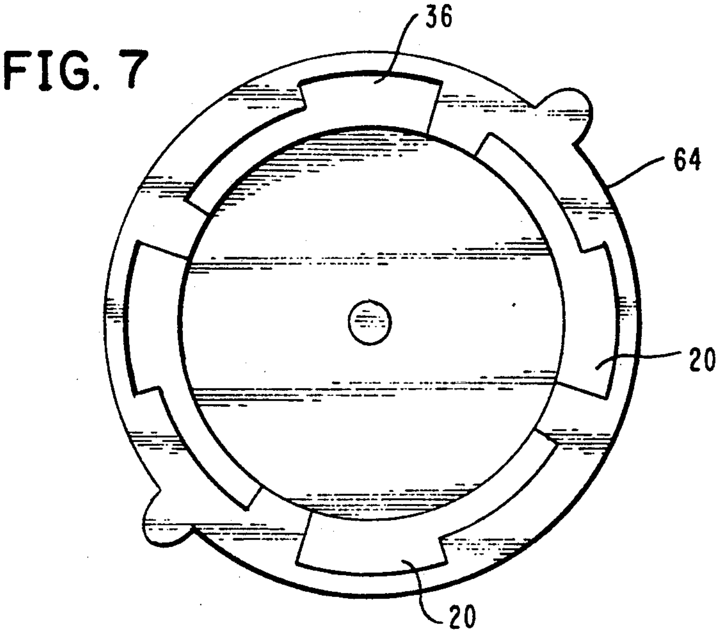
FIG. 7 is a top plan view of the adapter plate shown in FIG. 6.
Figure 8:
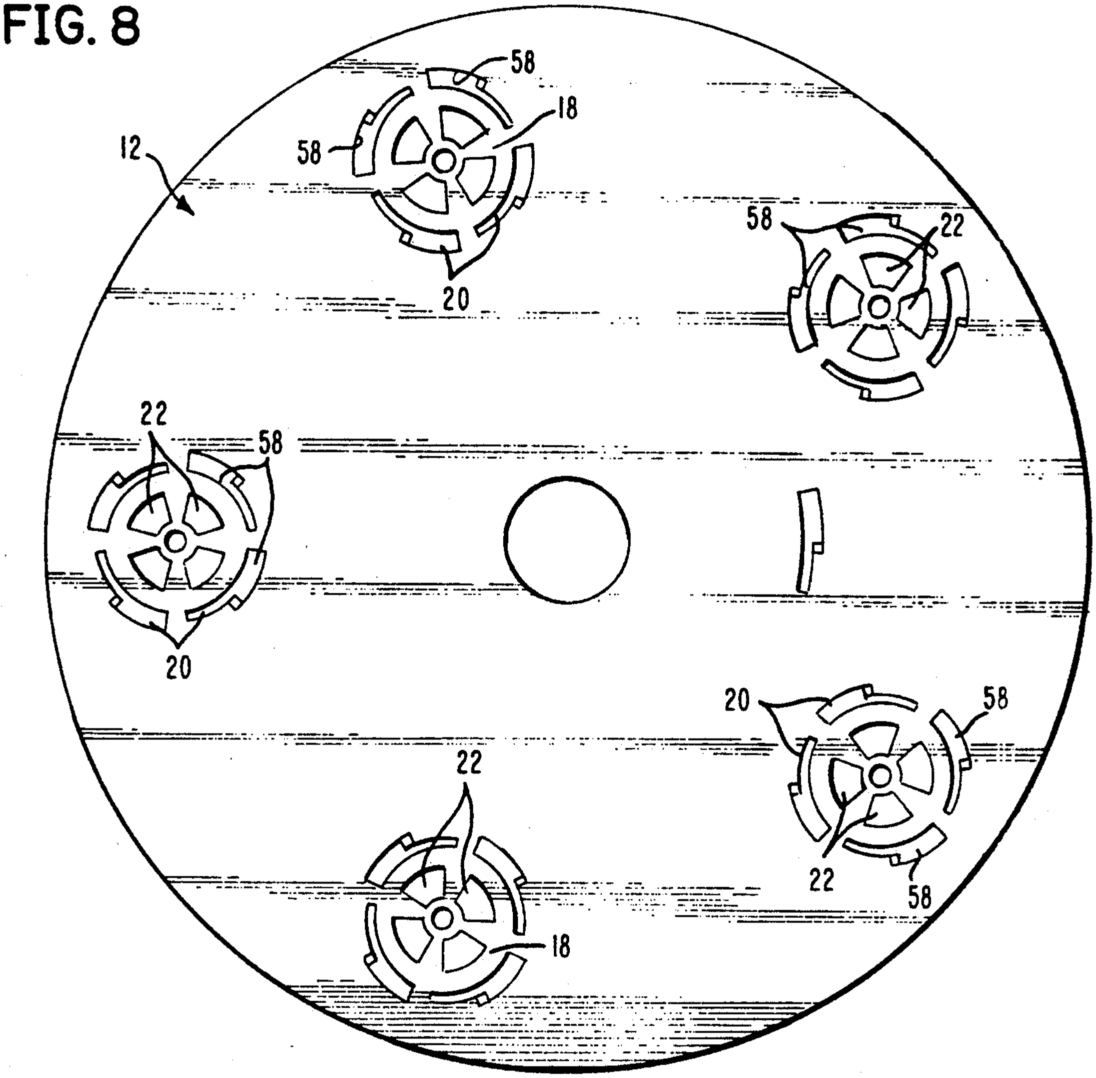
FIG. 8 is a top plan view of an embodiment of the upper base member of the present invention.

Preferably the individual instrument support means 26 with the bell shaped downwardly extending arm members 56 will be engageable with respect to the engagement apertures 58 merely by the insertion therein and a quarter turn as best shown by the upper plan view shown in FIG. 8. Also a universal stand adapter as shown in FIGS. 6 and 7 can be utilized with any type of stand to provide a means for mounting of the instrument support device 26 of the present invention with respect to any type of configuration of musical instrument stand commonly on the market today especially woodwind instruments. The adapters 64 further widen the variations in usage of the apparatus of the present invention.

Figure 2:
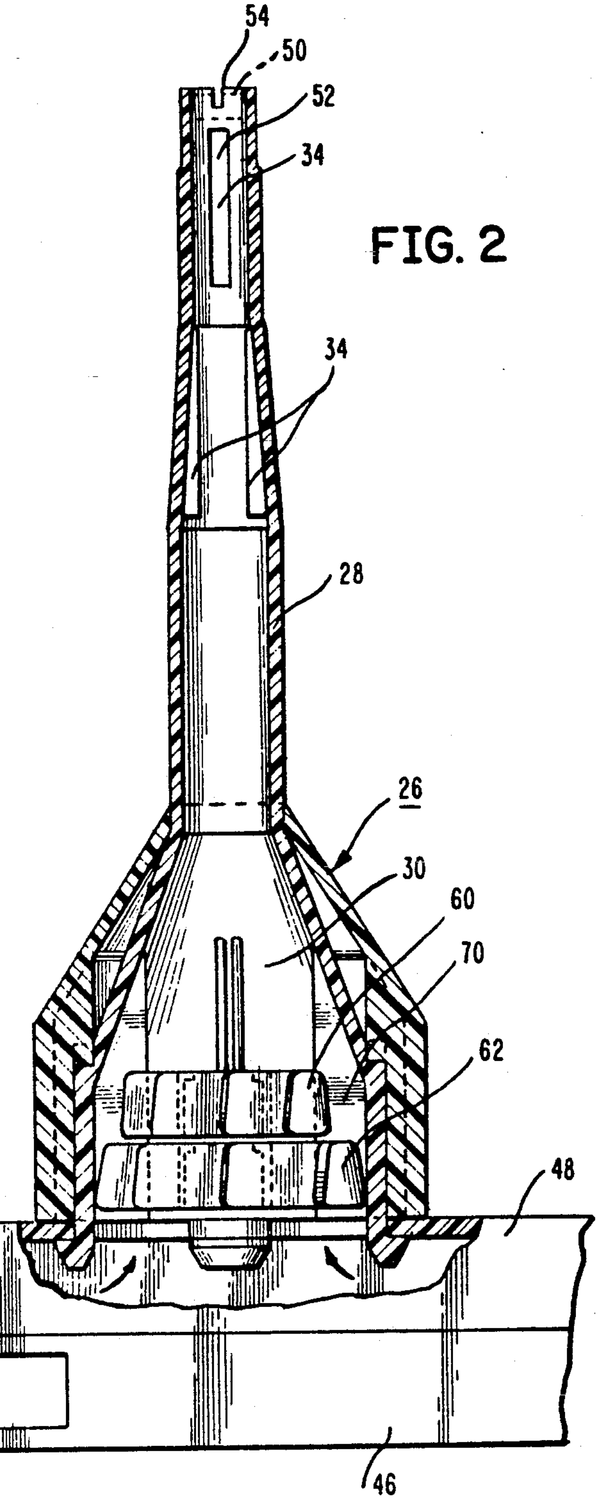
FIG. 2 is a front cross sectional view.
Figure 5:
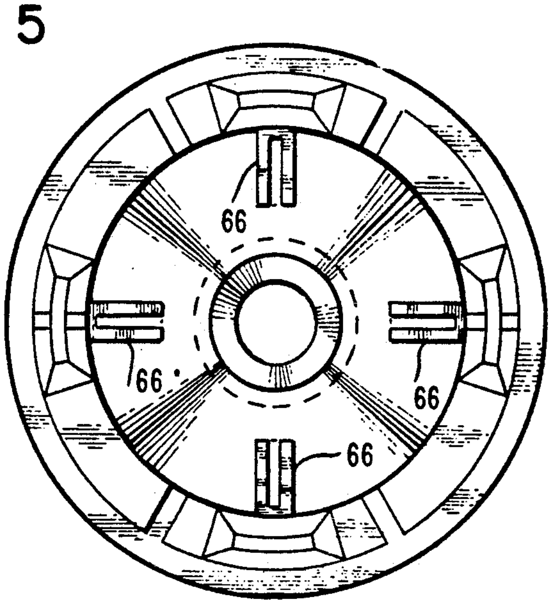
FIG. 5 top cross sectional view showing the clipping means for retaining spacers not in use.
Figure 9:
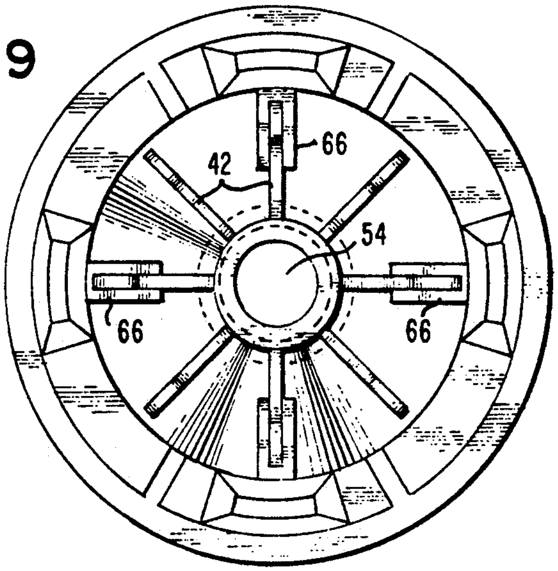
FIG. 9 is a top cross sectional view of an embodiment of the apparatus of the present invention showing the clipping means of FIG. 5 with an external spacing device positioned therein.
Figure 10:
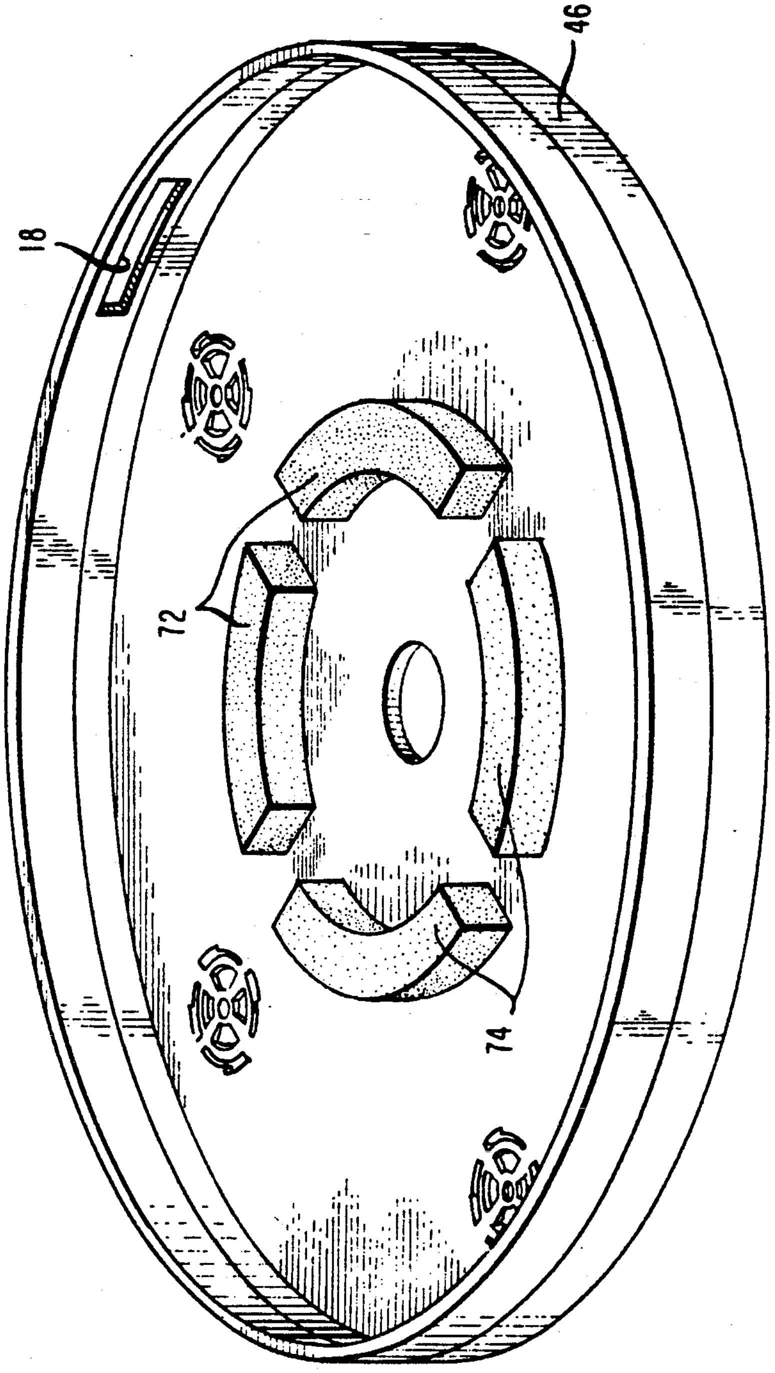
FIG. 10 is a top perspective view of the lower base member of the present invention showing the moisture retaining members positioned therein.

When multiple spacing sizes are included for the spacers 60 and 62 they can be retained within a retainment chamber 70 as shown best in FIG. 2. This retainment chamber 70 will prevent misplacing or loss of the individual spacers 60 and/or 62 when not in use. To facilitate this retainment a clip means 66 as shown best in FIG. 5 and FIG. 9 may be included within the retainment chamber 70.

As shown in the apparatus of the present invention and particularly in FIG. 4 the heated air will exit through the body outlets 34 and particularly through the lateral outlets 52 and will then be capable of traveling upwardly and downwardly in a free manner as shown by arrows 68 in order to equalize the temperature along the entire length of the musical instrument 10. This is made possible by the combination of purposes of the external spacing device 38 and the spacing openings 40 defined therein preferably between the individual rib members 42 and/or 44.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An improved universal support apparatus for heating and supporting of a musical instrument comprising:

a) a base member defining a heated air chamber means therein, said base member further defining a base inlet means therein in fluid flow communication with respect to said heated air chamber means to facilitate supplying of heated air thereto, said base member defining a mounting location means including a mounting means and a base outlet means to facilitate support of a musical instrument with respect thereto, said base outlet means being in fluid flow communication with respect to said heated air chamber means to allow heated air to exit therefrom;

b) a heating means in fluid flow communication with respect to said base inlet means and said heated air chamber means to supply heated air thereto;

c) an instrument support means detachably attached with respect to said mounting means at said mounting location means on said base member, said instrument support means including:

(1) a body member detachably attached with respect to said mounting means of said base member at said mounting location means and extending upwardly therefrom adapted to receive a musical instrument positioned thereon as desired, said body member defining a support chamber means therein and a support chamber inlet means being in fluid flow communication with respect to one another, said support chamber inlet means being in fluid flow communication with respect to said base outlet and said heated air chamber means responsive to said body member being mounted with respect to said mounting means of said base member to allow heated air to flow from said heated air chamber means to said support chamber means, said body member further defining body outlet means thereon to allow heated air to flow outwardly therethrough from said support chamber means to contact a musical instrument positioned upon said body member to facilitate heating thereof;

(2) a securement means fixedly attached with respect to said body member and detachably securable with respect to said mounting means to detachably secure said instrument support means with respect to said base member as desired; and d) an external spacing means attached with respect to said body member of said instrument support means to facilitate movement of heated air after exiting said body outlet means along a musical instrument positioned upon said body member of said instrument support means.

2. An improved universal support apparatus for heating and supporting of a musical instrument as defined in claim 1 therein said external spacing means defines spacing opening means therein to facilitate flow of heated air past said external spacing means to aid in heating of a musical instrument mounting upon said body member.

3. An improved universal support apparatus for heating and supporting of a musical instrument as defined in claim 1 wherein said external spacing means includes rib means extending laterally outwardly from said body member of said instrument support means to further facilitate travel of heated air to a musical instrument supported thereon, said rib means defining said opening means therebetween.

4. An improved universal support apparatus for heating and supporting of a musical instrument as defined in claim 3 wherein said rib means are flexibly resilient to facilitate mounting of a musical instrument on said instrument support means without damaging thereof.

5. An improved universal support apparatus for heating and supporting of a musical instrument as defined in claim 4 wherein said rib means extend spirally outwardly from said body member to facilitate flexible resilience thereof.

6. An improved universal support apparatus for heating and supporting of a musical instrument as defined in claim 1 wherein said instrument support means is made from highly ductile thermoplastic.

7. An improved universal support apparatus for heating and supporting of a musical instrument as defined in claim 1 wherein said base member comprises:

a) a lower base member defining said base inlet means therein; and b) an upper base member being movable with respect to said lower base member and defining said heated air chamber means therebetween.

8. An improved universal support apparatus for heating and supporting of a musical instrument as defined in claim 7 wherein said upper base member is rotatably movable with respect to said lower base member.

9. An improved universal support apparatus for heating and supporting of a musical instrument as defined in claim 1 further including visual aiding means located on the upper area of said instrument support means to facilitate viewing thereof in low lighting environments.

10. An improved universal support apparatus for heating and supporting of a musical instrument as defined in claim 1 wherein said instrument support means includes a spacing retaining means to facilitate storage of said external spacing means when not in use.

11. An improved universal support apparatus for heating and supporting of a musical instrument as defined in claim 10 wherein said spacing retaining means includes spacing clip means attached with respect to said instrument support means and adapted to be attachable with respect to said external spacing means to facilitate holding thereof with respect to said body member as desired for storage thereof.

12. An improved universal support apparatus for heating and supporting of a musical instrument as defined in claim 1 wherein said support chamber inlet means is registrable with respect to said base outlet means responsive to said instrument support means being mounted with respect to said mounting means of said base member.

13. An improved universal support apparatus for heating and supporting of a musical instrument as defined in claim 1 wherein said body outlet means includes a plurality of lateral outlets extending laterally outwardly with respect to said body member to facilitate heating of a musical instrument positioned thereon.

14. An improved universal support apparatus for heating and supporting of a musical instrument as defined in claim 1 wherein said body outlet means includes a plurality of lateral outlets extending laterally outwardly with respect to said body member below said external spacing means to facilitate complete and even heating of a musical instrument positioned thereon.

15. An improved universal support apparatus for heating and supporting of a musical instrument as defined in claim 1 wherein said body outlet means includes an upper outlet means at the uppermost position on said body member to facilitate exit of heated air therefrom.

16. An improved universal support apparatus for heating and supporting of a musical instrument as defined in claim 1 wherein said securement means includes a plurality of L-shaped downwardly extending arm members adapted to engage said mounting means of said base member.

17. An improved universal support apparatus for heating and supporting of a musical instrument as defined in claim 16 wherein said arm members are axially symmetrically positioned about said instrument support means.

18. An improved universal support apparatus for heating and supporting of a musical instrument as defined in claim 16 wherein said mounting means of said base member defines a plurality of engagement apertures adapted to engage said downwardly extending arm members of said mounting means of said base member to facilitate engagement of said instrument support means with respect to said base member.

19. An improved universal support apparatus for heating and supporting of a musical instrument as defined in claim 1 further comprising a humidification means positioned within the path flow of air from said heating means to facilitate the maintaining of the level of moisture within a musical instrument mounted upon said instrument support means.

20. An improved universal support apparatus for heating and supporting of a musical instrument comprising:

a) a base member comprising:

(1) a lower base member defining a base inlet means therein; and (2) an upper base member being rotatably movable with respect to said lower base member and defining a heated air chamber means therebetween, said heated air chamber means being in fluid flow communication with respect to said base inlet means to facilitate supplying of heated air thereto, said upper base member further defining a mounting location means thereon including a mounting means and a base outlet means to facilitate support of a musical instrument with respect thereto, said base outlet means being registrable with respect to said heated air chamber means and being in fluid flow communication therewith to allow heated air to exit therefrom into said heated air chamber means, said mounting means defining a plurality of symmetrically positioned engagement apertures therein;

b) a heating means in fluid flow communication with respect to said base inlet means and said heated air chamber means to supply heated air thereto;

c) an instrument support means of ductile thermoplastic being detachably attached with respect to said mounting means at said mounting location means on said base member, said instrument support means including:

(1) a body member detachably attached with respect to said mounting means of said base member at said mounting location means and extending upwardly therefrom adapted to receive a musical instrument positioned thereon as desired, said body member defining a support chamber means therein and a support chamber inlet means in fluid flow communication with respect to one another, said support chamber inlet means being in fluid flow communication with respect to said base outlet and said heated air chamber means responsive to said body member being mounted with respect to said mounting means of said base member to allow heated air to flow from said heated air chamber means to said support chamber means, said body member further defining lateral body outlet means thereon to allow heated air to flow outwardly therethrough from said support chamber means to contact a musical instrument positioned upon said body member to facilitate heating thereof, said body member further including an upper outlet means at the uppermost position on said body member to facilitate exit of heated air therefrom;

(2) a securement means fixedly attached with respect to said body member and detachably securable with respect to said mounting means to detachably secure said instrument support means with respect to said base member as desired, said securement means including a plurality of L-shaped downwardly extending arm members adapted to engage said engagement apertures defined by said mounting means of said base member;

d) an external spacing means attached with respect to said body member of said instrument support means above said lateral body outlets, said external spacing means defining spacing opening means therein to facilitate movement of heated air past said external spacing means after exiting said body outlet means along a musical instrument positioned upon said body member of said instrument support means, said external spacing means including rib means extending laterally outwardly from said body member of said instrument support means to define said spacing opening means therebetween and to further facilitate travel of heated air along a musical instrument supported thereon;

e) visual aiding means located on the upper area of said instrument support means to facilitate viewing thereof in low lighting environments; and f) a spacing retaining means positioned within said heated air chamber of said base member to facilitate storage of said external spacing means, said spacing retaining means including clip means attachable with respect to said base member and with respect to said external spacing means to facilitate storage thereof.

* * * * *